US012755155B1

(12) United States Patent
Pronovost

(10) Patent No.: US 12,755,155 B1
(45) Date of Patent: Oct. 6, 2026

(54) ALTERNATING GRADIENT COMPUTATION

(71) Applicant: Zoox, Inc., Foster City, CA (US)

(72) Inventor: Ethan Miller Pronovost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 1315 days.

(21) Appl. No.: 17/092,113

(22) Filed: Nov. 6, 2020

(51) Int. Cl.
*G06N 3/084* (2023.01)
*G06N 3/04* (2023.01)

(52) U.S. Cl.
CPC ............... *G06N 3/084* (2013.01); *G06N 3/04* (2013.01)

(58) Field of Classification Search
CPC ................................. G06N 3/084; G06N 3/04
See application file for complete search history.

(56) References Cited

U.S. PATENT DOCUMENTS 11,748,666 B2 * 9/2023 Zhang et al.
2017/0132513 A1 * 5/2017 Yu ......................... G06F 9/5016
2017/0140270 A1 * 5/2017 Mnih et al.
2019/0034794 A1 * 1/2019 Ogale ................ G01C 21/3407
2020/0184321 A1 * 6/2020 Fulop et al.
2020/0272901 A1 * 8/2020 Inoue et al.
2021/0133583 A1 * 5/2021 Chetlur et al.
2022/0035762 A1 * 2/2022 Liu et al.

OTHER PUBLICATIONS

Feng, J., & Huang, D. (2019). Optimal Gradient Checkpoint Search for Arbitrary Computation Graphs. https://doi.org/https://arxiv.org/abs/1808.00079v4 (Year: 2019).*

Feng, J., & Huang, D. (2019). Optimal Gradient Checkpoint Search for Arbitrary Computation Graphs. https://doi.org/https://arxiv.org/abs/1808.00079v4 (Year: 2019) (Year: 2019).*

B. Ding, H. Qian and J. Zhou, "Activation functions and their characteristics in deep neural networks," 2018 Chinese Control and Decision Conference (CCDC), Shenyang, China, 2018, pp. 1836-1841, doi: 10.1109/CCDC.2018.8407425. (Year: 2018) (Year: 2018).*

Chen, T., Xu, B., Zhang, C., & Guestrin, C. (2016). Training Deep Nets with Sublinear Memory Cost. ArXiv, abs/1604.06174. (Year: 2016).*

(Continued)

*Primary Examiner* — Usmaan Saeed
*Assistant Examiner* — Hyungjun B Yi
(74) *Attorney, Agent, or Firm* — Lee & Hayes, P.C.

(57) ABSTRACT

Techniques for training a machine learning model are described herein. For example, the techniques may include determining a gradient variable to store in memory to determine gradient values for two or more operations of a neural network. The gradient variable may represent an input or an output of an operation and can be accessed from the memory to determine multiple different gradient values during backward propagation. Such techniques may be used to train a neural network that can reduce a number of gradient variables stored in memory during forward propagation based on determining a gradient variable that is usable as an input to multiple gradient functions associated with a sequence of operations.

20 Claims, 4 Drawing Sheets

(56) References Cited

OTHER PUBLICATIONS

B. Ding, H. Qian and J. Zhou, "Activation functions and their characteristics in deep neural networks," 2018 Chinese Control and Decision Conference (CCDC), Shenyang, China, 2018, pp. 1836-1841, doi: 10.1109/CCDC.2018.8407425. (Year: 2018).*
Feng, J., & Huang, D. (2019). Optimal Gradient Checkpoint Search for Arbitrary Computation Graphs. doi.org/https://arxiv.org/abs/1808.00079v4 (Year: 2019).*
Chen, T., Chiyuan, Z., & Guestrin, C. (2016). Training Deep Nets with Sublinear Memory Cost (Year: 2016).*
Dean, Jeffrey & Corrado, G.s & Monga, Rajat & Chen, Kai & Devin, Matthieu & Le, Quoc & Mao, Mark & Ranzato, Aurelio & Senior, Andrew & Tucker, Paul & Yang, Ke & Ng, Andrew. (2012). Large Scale Distributed Deep Networks (Year: 2012).*
Recht, B., Re, C., Wright, S.J., & Niu, F. (2011). Hogwild: A Lock-Free Approach to Parallelizing Stochastic Gradient Descent. Neural Information Processing Systems (Year: 2011).*
Li, M., Andersen, D.G., Smola, A., & Yu, K. (2014). Communication Efficient Distributed Machine Learning with the Parameter Server. Neural Information Processing Systems (Year: 2014).*
Bulo, S. R., Porzi, L., & Kontschieder, P. (2018). In-place activated batchnorm for memory-optimized training of dnns. In Proceedings of the IEEE conference on computer vision and pattern recognition (pp. 5639-5647). (Year: 2018).*
Paszke, A., Gross, S., Chintala, S., Chanan, G., Yang, E., DeVito, Z., . . . & Lerer, A. (2017). Automatic differentiation in pytorch. (Year: 2017).*

* cited by examiner

ALTERNATING GRADIENT COMPUTATION

BACKGROUND

Machine learning algorithms such as neural networks are often trained to perform a task by considering training data. For example, image data that has been previously associated with a classification may be fed into a neural network to train the neural network to recognize the classification. During training, a processor, such as a Graphics Processing Unit (GPU), stores all activations that are computed during forward propagation for the neural network, and then uses those activations during backwards propagation. This requires a relatively large amount of memory on the processor. Further, this limits the amount of data that can be fed into a neural network for training. In cases where learning a task requires a specific amount of training data, and that amount of training data uses more memory during training than that available on a processor or even a cluster of processors, a neural network may not be trained for some tasks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
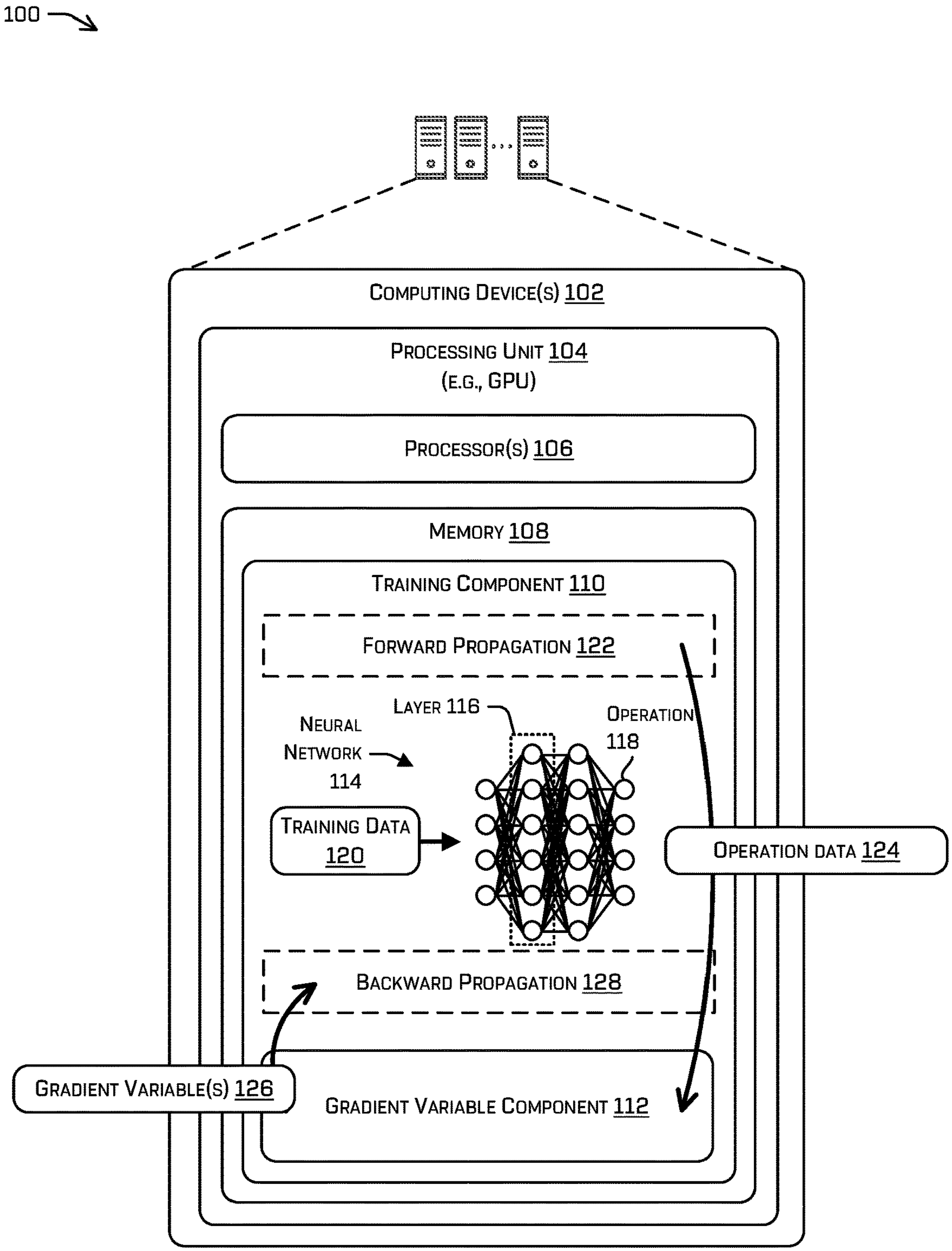
FIG. 1 illustrates an example environment, in which an example computing device trains a neural network using the techniques discussed herein.

Techniques for training a machine learning algorithm are discussed herein. For instance, the techniques may be used to determine which inputs and/or outputs associated with a sequence of operations to store in memory for use during backpropagation. In some examples, a computing device may allocate a gradient variable in memory that is usable to compute multiple gradient values for multiple operations in the sequence of operations. Using the techniques described herein, a computing device may train a machine learning algorithm to store and/or access less data to and/or from memory, thereby enabling more training data to be processed during forward propagation before reaching computational limitations of the computing device.

The systems and techniques disclosed herein may provide for processing larger amounts and/or more complex training data by determining to store a subset of the inputs and/or outputs typically saved in memory to compute gradient values. In some examples, training techniques can include identifying an operation that is associated with multiple gradient value functions, and determining whether one of the multiple gradient value functions can use a gradient variable already identified for storage in memory. Computing a gradient value typically requires storing a value in memory for all operations input into a neural network for training. However, using the techniques described herein, during training of a neural network at least some operations may implement gradient value functions that utilize a same gradient variable to compute respective gradient values.

Generally, a neural network (e.g., an artificial neural network) may be trained to perform one or more tasks. Such training includes forward propagation and backwards propagation. During forward propagation (also referred to as a forward pass), data may be input into the artificial neural network to compute activations at layers within the artificial neural network, and ultimately, an output. Each layer may be associated with one or more operations (or nodes) and each operation may be associated with a weight. During backwards propagation (also referred to as a backwards pass or backpropagation), an error representing a difference between the output and a desired output (e.g., a ground truth) may be propagated backwards through the layers of the artificial neural network to adjust the weights (e.g., using gradient descent). The backwards propagation may include executing one or more gradient functions associated with the one or more operations of the forward propagation to generate one or more gradient values.

As mentioned above, the systems and techniques disclosed herein relate to neural networks that may include one or more operations that can have a gradient value computed from two different gradient value functions. For instance, an operation May receive one or more inputs and perform an action to generate an output. In some examples, the operation may comprise a mathematical operation like a multiplication operation which multiplies an input (e.g., x) by as value to determine an output (e.g., y). In some examples, the operation may comprise an activation function, such as a rectified linear unit (ReLU) operation or a softmax operation, just to name a few. Regardless of the type of operation, the training techniques described herein are configured to identify operations whose gradient value can be computed from its input and/or its output. In such examples, a gradient variable usable by at least two gradient value functions (e.g., a first gradient function to determine a first gradient value for a first operation and a second gradient function to determine a second gradient value for a second operation) can be stored in memory instead of storing two gradient variables, one for each of the two gradient functions.

In some examples, a computing device may identify, during training of a neural network, whether an operation in a sequence of operations may be associated with multiple gradient implementations. For instance, a first gradient value function may determine a first gradient value associated with the input of the first operation and a second gradient value function may determine a second gradient value associated with the output of the first operation. In examples when the first gradient value and the second gradient value are the same, the operation can be considered to have multiple gradient implementations. In this way, a gradient value of the operation may be determined from a variable associated with the input or a variable associated with the output.

In various examples, training techniques described herein may comprise identifying a variable for storage in memory that is usable for two or more gradient value functions to compute gradient values for two or more operations in a sequence of operation. In some examples, a computing device may analyze inputs (or the variables associated therewith) and/or outputs of an operation, and determine whether another operation may use the input and/or output to compute a gradient value. If such examples, the computing device may forgo storing an input or an output for at least some operations in the sequence of operations in memory for use during backward propagation (e.g., to determine a gradient value) thereby saving available memory for processing further training data.

The training techniques described herein may also or instead comprise a computing device determining whether inputs (or the variables associated therewith) and/or outputs (or the variables associated therewith) of an operation are usable to compute a gradient value for at least one other operation. In some examples, data associated with an operation (e.g., data associated with the input, the output, a variable of the input, a variable of the output, etc.) may be compared to data of another operation, and based on the comparing, a computing device may detect, infer, estimate, or otherwise determine a subset of the data from both operations that is usable to determine gradient values for both operations (e.g., is usable in different gradient value functions associated with different operations). Accordingly, the techniques can include optimizing an amount of data stored in memory during forward propagation.

In some examples, a computing device may determine to associate metadata or other information to indicate an intention to store data associated with an operation (e.g., data associated with the input, the output, a variable of the input, a variable of the output, etc. of a first operation). The associated metadata may be used by the computing device to determine whether to store data (e.g., the input, the output, a variable of the input, a variable of the output, etc.) associated with a second operation received after the first operation. In such examples, the output from the first operation may serve as an input to the second operation. By tagging, annotating, or otherwise associating information to data to be stored data, a gradient variable(s) may be determined for at least two operations without requiring that data be stored for each operation.

In some examples, training a neural network can comprise a computing device receiving a sequence of operations during forward propagation and determining a first variable associated with an input to a first operation and a second variable associated with an output from the first operation. In such examples, the computing device may determine that a first gradient value function using the first variable associated with the input of the first operation and a second gradient value function using the second variable associated with the output of the first operation generate a substantially same gradient value result (e.g., the result is mathematically equivalent within a given threshold). Subsequently, the computing device may determine that to compute the second gradient value associated with the second operation requires the second variable associated with the output of the first operation, determine, based at least in part on determining that the first gradient value function and the second gradient value function generate the substantially same gradient value result, that to compute the first gradient value associated with the first operation requires either the first variable associated with the input of the first operation or the second variable associated with the output of the first operation, and determine that the second variable associated with the output of the first operation in the memory is usable to compute the first gradient value associated with the first operation and the second gradient value associated with the second operation.

In some examples, the operation may comprise at least one of: a rectified linear unit operation, a maximum operation, a minimum operation, an exponentiation operation, a logarithmic operation, a power operation, a sigmoid operation, a softplus operation, or a batch normalization operation.

In some examples, training techniques may implement a distributed training pipeline comprising a plurality of Graphics Processing Units (GPUs) and/or Tensor Processing Units (TPUs) that collectively operate to train a neural network using a training data set. In some examples, each of the GPUs and/or TPUs may receive a local batch of training samples selected from the entire training data set. Each GPU and/or TPU may then input the respective local batch of training samples to a local copy of the neural network as training data.

In some examples, machine learning models that may be trained include neural networks that may: classify objects in image data; identify an emergency vehicle in audio data; generate bounding boxes from lidar data; predict locations of objects; determine when to buy plane tickets; identify cancer in tissue samples, and so on.

In examples, the gradient variable determination techniques discussed herein may provide higher training accuracy without sacrificing training speed when compared to other training techniques not using such techniques. In addition, in some examples, the gradient variable determination techniques discussed herein may reducing training time by training in parallel and/or improve accuracy by reducing an amount of data to be stored. Further, such techniques provide for training networks based on larger datasets than would otherwise not be enabled due to, for example, limitations of memory, processing power, etc. (thereby creating more robust learned networks in shorter amounts of time).

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an example environment 100, in which an example computing device trains a neural network using the techniques discussed herein. As illustrated, the environment 100 includes a computing device(s) 102 that includes a processing unit 104 comprising processor(s) 106, and memory 108.

The computing device(s) 102 may be implemented as one or more laptop computers, desktop computers, servers, and so on. In examples, the computing device(s) 102 is configured in a cluster, data center, cloud computing environment, or a combination thereof. In one example, the computing device(s) 102 provides cloud computing resources, including computational resources, network resources, storage resources, and the like, that operate remotely to another computing device, such as a client device. To illustrate, the computing device(s) 102 may implement a cloud computing platform/infrastructure for building, deploying, and/or managing applications and/or services.

The processing unit 104 (e.g., a processor(s) 106 associated with the first processing unit 104) each comprise one or more GPUs, one or more CPUs, one or more tensor processing units, one or more neural processing units, one or more digital signal processors, etc. In various examples, the processing unit 104 may be implemented as a GPU and may optionally include a second processing unit (not shown), although other configurations may be used.

The memory 108 may store a training component 110 and a gradient variable component 112 that are executable by the processor(s) 106. Further, though the processing unit 104 and the memory 108 are depicted in FIG. 1 as residing in the same computing device 102, such a depiction is for illustrative purposes, as the processing unit 104 and/or the memory 108 may be in separate units, which may or may not be local to the computing device 102.

The memory 108 may be examples of non-transitory computer-readable media. The memory 108 may store an operating system and/or one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As depicted in FIG. 1, the training component 110 comprises a neural network 114 showing an example layer 116 and an example operation 118 that can receive training data 120 during forward propagation 122. Generally, the gradient variable component 112 provides functionality to receive operation data 124 associated with operations of the neural network 114, and determine to store gradient variable(s) 126 for use during backward propagation 128. In some examples, the gradient variable component 112 may be configured to detect, identify, or otherwise determine a gradient variable usable to compute two or more gradient values for two or more distinct operations of the neural network 114.

In some examples, the gradient variable component 112 may be configured to determine that a gradient value may be computed from two different gradient value functions. In various examples, the gradient variable component 112 may be configured to identify operations of the neural network 114 having a gradient value that can be computed from its input and/or its output, and/or to determine whether an operation in a sequence of operations may be associated with multiple gradient implementations.

In various examples, the gradient variable component 112 may determine a gradient variable usable by at least two gradient value functions (e.g., a first gradient function to determine a first gradient value for a first operation and a second gradient function to determine a second gradient value for a second operation), and further determine to store the gradient variable in memory (e.g., instead of storing one gradient variable for each of the two gradient functions). In some examples, the gradient variable component 112 may compare the operation data 124 (e.g., data associated with the input, the output, a variable of the input, a variable of the output, etc.) of different operations, and based on the comparing, determine a subset of the operation data 124 associated with each of the operations that is usable to determine gradient values for both operations. In some examples, the gradient variable component 112 may associate metadata or other information to indicate an intention to store data associated with the operation 118. Additional descriptions for determining gradient variables are discussed throughout this disclosure.

The training component 110 may be executed by the processor(s) 106 to train the neural network 114 (also referred to as "the neural network") based on the training data 120. The training data 120 may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data 120 may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Data that is used by the training component 110 (e.g., the training data 120) and/or the gradient variable component 112 (e.g., data that is fed into the neural network 114) may include a variety of data. For example, the data may include depth data from one or more sensors, such as lidar data, radar data, image data (as determined from multi-view geometry), depth sensor data (time of flight, structured light, etc.), etc. In some examples, the computing device(s) 102 may receive (e.g., retrieve) data from a data store, such as a database. Here, the data store can store data over time as the data is received from one or more vehicles or other devices within an environment. In some examples, the computing device(s) 102 may receive data from one or more vehicles or other devices as the data is being captured (e.g., real-time), in a batched manner, in one or more log files received from a vehicle, or at any other time.

As illustrated, the neural network 114 may include a plurality of layers. Each layer (e.g., layer 116) may include one or more nodes (also referred to as neurons or perceptrons). In the example of FIG. 1, the neural network 114 includes four layers such as the layer 116 that includes six operations or six nodes. However, it can be understood that any number of layers and/or nodes may be implemented. In examples, the neural network 114 may include a bias node(s), not illustrated in FIG. 1. A node, such as a node associated with a layer, may be associated with an operation and a weight. An operation at one layer may be executed to generate an output, which is provided to a next layer as input (e.g., to an operation associated with the next layer in a forward graph). The operation 118 may be representative of an operator applied to an input to generate an output, and may comprise at least one of: a rectified linear unit operation, a maximum operation, a minimum operation, an exponentiation operation, a logarithmic operation, a power operation, a sigmoid operation, a softplus operation, or a batch normalization operation, just to name a few.

In some examples, the training component 110 may be configured to perform cross batch normalization during training. The training component 110 may, for instance, may implement cross batch normalization in association with the operation 118. Additional details of training a neural network using cross batch normalization is described in U.S. patent application Ser. No. 16/653,656, filed on Oct. 15, 2019, entitled "Cross Batch Normalization," which is incorporated herein by reference in its entirety for all purposes.

Each layer of the neural network 114 may generate an output from a received input (e.g. either an initial input to the neural network or an input from a preceding layer). Some or all of the neural network layers may generate outputs from inputs in accordance with current values of a set of parameters for the neural network layer. For example, some layers may multiply the received input by a matrix of current parameter values as part of generating an output from the received input.

The output is then output or passed to the next layer in the neural network. In this way, the neural network layers collectively process neural network inputs received by the neural network system to generate a respective neural network output for each received neural network input.

In some examples, the computing device(s) 102 may receive a plurality of lidar datasets from a plurality of lidar sensors operated in connection with a perception system of an autonomous vehicle. In some examples, the computing device(s) 102 may combine or fuse data from two or more lidar sensors into a single lidar dataset (also referred to as a "meta spin"). In some examples, the computing device(s) 102 may extract a portion of lidar data for processing, such as over a period of time. In some examples, the computing device(s) 102 may receive radar data and associate the radar data with the lidar data to generate a more detailed representation of an environment. In one illustration, data includes lidar data (e.g., point clouds) associated with various objects in an urban environment, such as cars, trucks, roads, buildings, bikes, pedestrians, etc. Of course, such data need not be sensor data at all. In various examples, training data may comprise features defined for a particular problem and their associated expected output. As a non-limiting example, such data may comprise house square foot size, a number of bedrooms, a number of floors, etc., with an associated home sale price for training a network to predict a houses likely sale price.

During back propagation 128, the neural network outputs can be used to adjust the values of the parameters of the neural network layers in the sequence, e.g., through gradient descent and backward propagation neural network training techniques. Further, the normalization statistics from the forward propagation may be back propagated through as part of adjusting the values of the parameters of the neural network, i.e., as part of performing the back propagation training technique.

The techniques discussed herein may be implemented in various contexts. In some examples, the techniques are implemented in the context of a machine learning application, such as TensorFlow, PyTorch, Python, Caffe, Caffe2, and the like.

Figure 2:
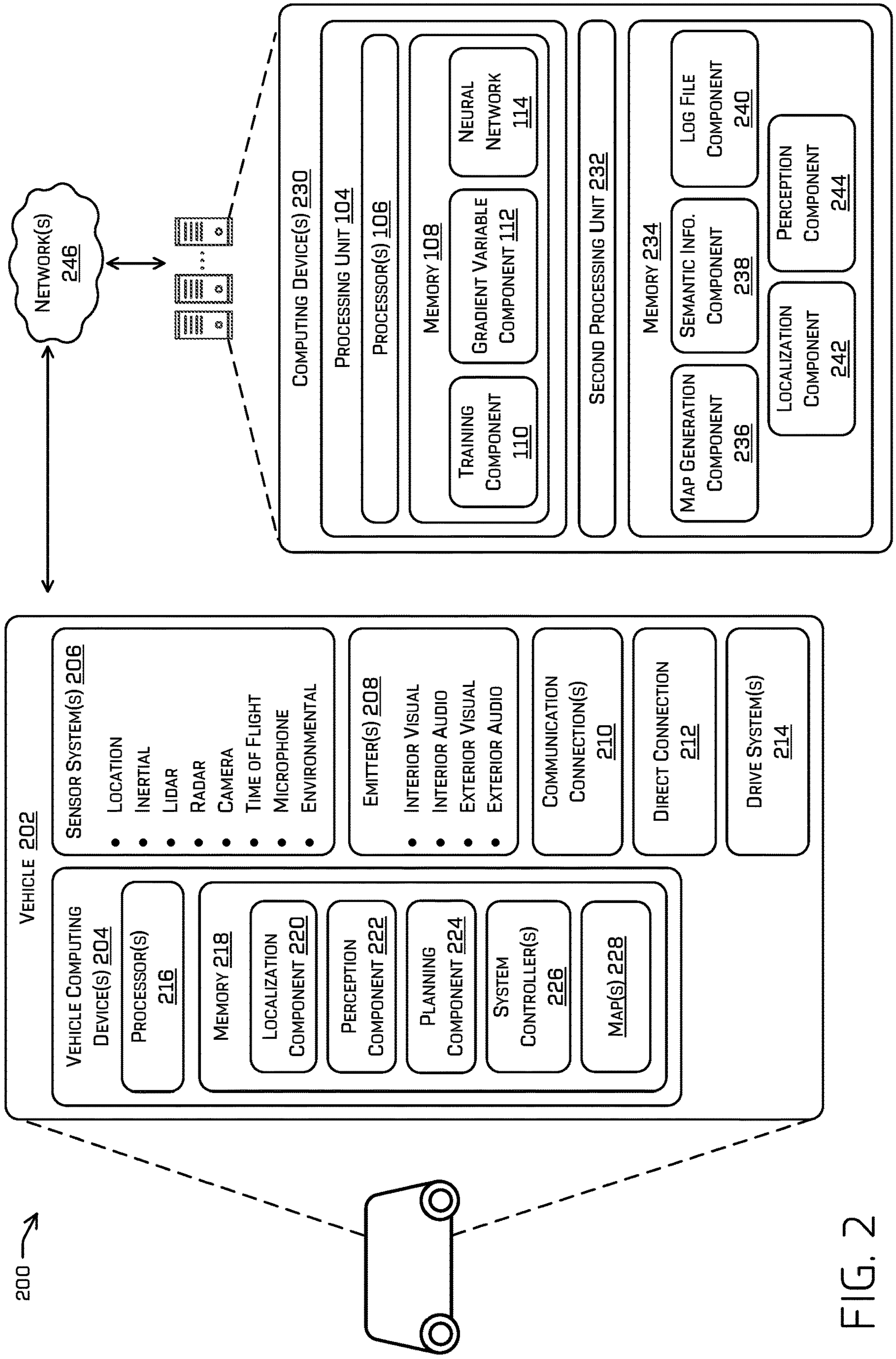
FIG. 2 is a block diagram of an example system for implementing the techniques described herein.

FIG. 2 is a block diagram of an example system 200 for implementing the techniques described herein. In at least one example, the system 200 may include a vehicle, such as vehicle 202.

The vehicle 202 may include a vehicle computing device(s) 204, one or more sensor systems 206, one or more emitters 208, one or more communication connections 210, at least one direct connection 212, and one or more drive systems 214.

The vehicle computing device(s) 204 may include one or more processors 216 and memory 218 communicatively coupled with the one or more processors 216. In the illustrated example, the vehicle 202 is an autonomous vehicle; however, the vehicle 202 could be any other type of vehicle, such as a semi-autonomous vehicle, or any other system having at least an image capture device (e.g., a camera enabled smartphone). In the illustrated example, the memory 218 of the vehicle computing device(s) 204 stores a localization component 220, a perception component 222, a planning component 224, one or more system controllers 226, and one or more maps 228. Though depicted in FIG. 2 as residing in the memory 218 for illustrative purposes, it is contemplated that the localization component 220, the perception component 222, the planning component 224, the one or more system controllers 226, and/or the one or more maps 228 may additionally, or alternatively, be accessible to the vehicle 202 (e.g., stored on, or otherwise accessible by, memory remote from the vehicle 202, such as, for example, on memory 108 or memory 234 of a remote computing device 230).

In at least one example, the localization component 220 may include functionality to receive data from the sensor system(s) 206 to determine a position and/or orientation of the vehicle 202 (e.g., one or more of an x-, y-, z-position, roll, pitch, or yaw). For example, the localization component 220 may include and/or request/receive a map of an environment, such as from map(s) 228 and/or map component 228, and may continuously determine a location and/or orientation of the autonomous vehicle within the map. In some instances, the localization component 220 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 220 may provide data to various components of the vehicle 202 to determine an initial position of an autonomous vehicle for determining the relevance of an object to the vehicle 202, as discussed herein.

In some instances, the perception component 222 may include functionality to perform object detection, segmentation, and/or classification. In some examples, the perception component 222 may provide processed sensor data that indicates a presence of an object (e.g., entity) that is proximate to the vehicle 202 and/or a classification of the object as an object type (e.g., car, pedestrian, cyclist, animal, building, tree, road surface, curb, sidewalk, unknown, etc.). In some examples, the perception component 222 may provide processed sensor data that indicates a presence of a stationary entity that is proximate to the vehicle 202 and/or a classification of the stationary entity as a type (e.g., building, tree, road surface, curb, sidewalk, unknown, etc.). In additional or alternative examples, the perception component 222 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In some examples, the planning component 224 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 202. In some examples, a prediction component may measure a trace of an object and generate a trajectory for the object based on observed and predicted behavior.

In at least one example, the vehicle computing device(s) 204 may include one or more system controllers 226, which may be configured to control steering, propulsion, braking, safety, emitters, communication, and other systems of the vehicle 202. The system controller(s) 226 may communicate with and/or control corresponding systems of the drive system(s) 214 and/or other components of the vehicle 202.

The memory 218 may further include one or more maps 228 that may be used by the vehicle 202 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 202 may be controlled based at least in part on the map(s) 228. That is, the map(s) 228 may be used in connection with the localization component 220, the perception component 222, and/or the planning component 224 to determine a location of the vehicle 202, detect or determine gravity, detect objects in an environment, generate routes, determine actions and/or trajectories to navigate within an environment.

In some examples, the one or more maps 228 may be stored on a remote computing device(s) (such as the computing device(s) 230) accessible via network(s) 246. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

As can be understood, the components discussed herein (e.g., the training component 110, the gradient variable component 112, the localization component 220, the perception component 222, the planning component 224, the one or more system controllers 226, the one or more maps 228) are described as divided for illustrative purposes. However, the operations performed by the various components may be combined or performed in any other component. For instance, the functionality of the gradient variable component 112 may be combined with or performed by the training component 110.

In some instances, aspects of some or all of the components discussed herein may include any models, techniques, and/or machine learned techniques. For example, in some instances, the components in the memory 218, the memory 108, and/or the memory 234 (discussed below) may be implemented as a neural network (e.g., the neural network 114).

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 206 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 may include multiple instances of each of these or other types of sensors. For instance, the lidar sensors may include individual lidar sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing device(s) 204. Additionally, or in the alternative, the sensor system(s) 206 may send sensor data, via the one or more networks 246, to the one or more computing device(s) 230 at a particular frequency, after a lapse of a predetermined period of time, in near real-time, etc. In some examples, the training component 110 may receive sensor data from one or more of the sensor system(s) 206.

The vehicle 202 may also include one or more emitters 208 for emitting light and/or sound. The emitters 208 may include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 may also include one or more communication connections 210 that enable communication between the vehicle 202 and one or more other local or remote computing device(s). For instance, the communication connection(s) 210 may facilitate communication with other local computing device(s) on the vehicle 202 and/or the drive system(s) 214. Also, the communication connection(s) 210 may allow the vehicle to communicate with other nearby computing device(s) (e.g., remote computing device 230, other nearby vehicles, etc.) and/or one or more remote sensor system(s) for receiving sensor data. The communication connection(s) 210 also enable the vehicle 202 to communicate with a remote teleoperations computing device or other remote services.

The communication connection(s) 210 may include physical and/or logical interfaces for connecting the vehicle computing device(s) 204 to another computing device or a network, such as network(s) 246. For example, the communication connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive systems 214. In some examples, the vehicle 202 may have a single drive system 214. In at least one example, if the vehicle 202 has multiple drive systems 214, individual drive systems 214 may be positioned on opposite ends of the vehicle 202 (e.g., the front and the rear, etc.). In at least one example, the drive system(s) 214 may include one or more sensor systems to detect conditions of the drive system(s) 214 and/or the surroundings of the vehicle 202. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 214. In some cases, the sensor system(s) on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 214. Furthermore, the drive system(s) 214 may also include one or more communication connection(s) that enable communication by the respective drive system with one or more other local or remote computing device(s).

In at least one example, the direct connection 212 may provide a physical interface to couple the one or more drive system(s) 214 with the body of the vehicle 202. For example, the direct connection 212 may allow the transfer of energy, fluids, air, data, etc. between the drive system(s) 214 and the vehicle. In some instances, the direct connection 212 may further releasably secure the drive system(s) 214 to the body of the vehicle 202.

In at least one example, the localization component 220, the perception component 222, the planning component 224, the one or more system controllers 226, and the one or more maps 228 may process sensor data, as described above, and may send their respective outputs, over the one or more network(s) 246, to the computing device(s) 230. In at least one example, the localization component 220, the perception component 222, the planning component 224, the one or more system controllers 226, and the one or more maps 228 may send their respective outputs to the remote computing device(s) 230 at a particular frequency, after a lapse of a predetermined period of time, in near real-time, etc.

In some examples, the vehicle 202 may send sensor data to the computing device(s) 230 via the network(s) 246. In some examples, the vehicle 202 may receive sensor data from the computing device(s) 230 and/or remote sensor system(s) 242 via the network(s) 246. The sensor data may include raw sensor data and/or processed sensor data and/or representations of sensor data. In some examples, the sensor data (raw or processed) may be sent and/or received as one or more log files.

The computing device(s) 230 may include the processing unit 106, the processor(s) 104, the memory 108 storing the training component 110, the gradient variable component 112, and the neural network.

In at least one example, in addition to the components mentioned in FIG. 1, the computing device(s) 230 may include a second processing unit 232 associates with one or more of the processor(s) 106, and a memory 234 storing a map generation component 236, a semantic information component 238, a log file component 240, a localization component 242, and a perception component 244. Although illustrated as being implemented on the computing device(s) 230, any one or more of the components 236-244 (and/or the components 110 and/or 112, or the neural network 114) may be implemented on the vehicle 202, such as stored within the memory 218 of the vehicle computing device 204 and executed by the processor(s) 216 of the vehicle computing device 204. Further, in some examples, multiple instances of one or more of the components 236-244 (and/or the components 110 and/or 112, or the neural network 114) may be implemented on separate devices. For example, a first instance of the gradient variable component 112 may be implemented on the computing device(s) 230 to perform offline/backend processing, and a second instance of the gradient variable component 112 may be implemented on the vehicle computing device 204 to perform online/local processing. In examples, the computing device(s) 230 may transfer, via the network(s) 246, a trained model (e.g., a trained model of the neural network 114) that is stored on the computing device(s) 230 to the vehicle 202.

The computing device(s) 230 may include one or more computing devices that are implemented at the same location and/or distributed. In one example, the first processing unit 104 is implemented on a first computing device and the second processing unit 232 and memory 234 are implemented on a second computing device. In another example, the first processing unit 104, the second processing unit 232, and the memory 108 are implemented on the same computing device. In yet other examples, other configurations are used.

In some instances, the map generation component 236 can include functionality to receive log file(s) and/or generate a three-dimensional (3D) map based on the data in log file(s). For example, the map generation component 236 can receive one or more of LIDAR data, image sensor data, GPS data, IMU data, Radar data, sonar data, etc. and can combine the data to generate a 3D map of the environment. The map generation component 236 can generate a 3D mesh (or other representation, e.g., Signed Distance Function, voxel, voxel hash, parameterized surfaces, NURBS, etc.) of an environment based on sensor data captured by one or more LIDAR sensors (or other sensors), for example. In some instances, surfaces in a 3D map can be represented by one or more polygons. In some instances, objects can be represented by voxels, histograms, or distribution functions. In some instances, surfaces in a 3D map can be represented by a parameterized entity. In some instances, the map generation component 236 can associate semantic information with individual polygons of the 3D mesh.

The semantic information component 238 can include functionality to receive semantic information and/or to determine semantic information based at least in part on a log file(s), and to associate the semantic information with individual polygons of the mesh of the 3D map. In some instances, the semantic information component 238 can perform segmentation and/or classification on the sensor data in the log file(s) (e.g., via one or more segmentation and/or classification algorithms, including, but not limited to machine learning algorithms, which may be trained by implementing the techniques discussed herein) to determine the semantic information at the computing device(s) 102. In some examples, semantic information can include a semantic classification of objects represented by polygons in the 3D map. The semantic information component 238 can use classical and/or machine learning (e.g., neural network) algorithms to receive data and output one or more detections, segmentations, and/or classifications of objects associated with the data.

The log file component 240 can store log files including sensor data (raw or processed) received from one or more vehicles, such as vehicle 202. The sensor data in the log file component 240 can represent sensor data collected by one or more onboard sensor systems (e.g., such as onboard sensor system(s) 206), or other sensor system(s), at previous time(s) (e.g., previously connected sensor data).

In at least one example, the localization component 242 can include functionality to determine a location of a vehicle relative to a map based on sensor data captured of an environment. In the context of LIDAR data, the localization component 242 can utilize SLAM, CLAMS, etc., or can align a point cloud of LIDAR data with the various polygons comprised in a 3D mesh. In some example, the localization component 242 can receive sensor data from the log file component 240 and can project or otherwise use the sensor data included in individual log files to localize a vehicle against various meshes.

In at least one example, the perception component 244 can include functionality to perform segmentation and/or classification on sensor data to determine attributes about objects, surfaces, elements, polygons, etc. in an environment. By way of example, the perception component 244 can analyze sensor data included in log files of the log file component 240 to detect, segment, and determine semantic information associated with objects represented in the sensor data (e.g. classify the object as belonging to one or more classes).

The processor(s) 216 of the vehicle 202 and the processor(s) 106 of the computing device(s) 230 may be any suitable processor capable of executing instructions to process data and perform operations/actions as described herein. By way of example and not limitation, the processor(s) 216 and 106 may comprise one or more Central Processing Units (CPUs), Graphics Processing Units (GPUs), Tensor Processing Units (TPUs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218, memory 108, and memory 234 are examples of non-transitory computer-readable media. The memory 218, memory 108, and memory 234 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 218, memory 108, and memory 234 may include at least a working memory and a storage memory. For example, the working memory may be a high-speed memory of limited capacity (e.g., cache memory) that is used for storing data to be operated on by the processor(s) 216 and 106. In some instances, the memory 218, memory 108, and memory 234 may include a storage memory that may be a lower-speed memory of relatively large capacity that is used for long-term storage of data. In some cases, the processor(s) 216 and 106 cannot operate directly on data that is stored in the storage memory, and data may need to be loaded into a working memory for performing operations/actions based on the data, as discussed herein.

It should be noted that while FIG. 2 is illustrated as a distributed system, in alternative examples, components of the vehicle 202 may be associated with the computing device(s) 230 and/or components of the computing device(s) 230 may be associated with the vehicle 202. That is, the vehicle 202 may perform one or more of the functions associated with the computing device(s) 230, and vice versa. For instance, either the vehicle 202 or the computing device(s) 230 may perform training operations relating to one or more of the models described herein.

Figure 3:
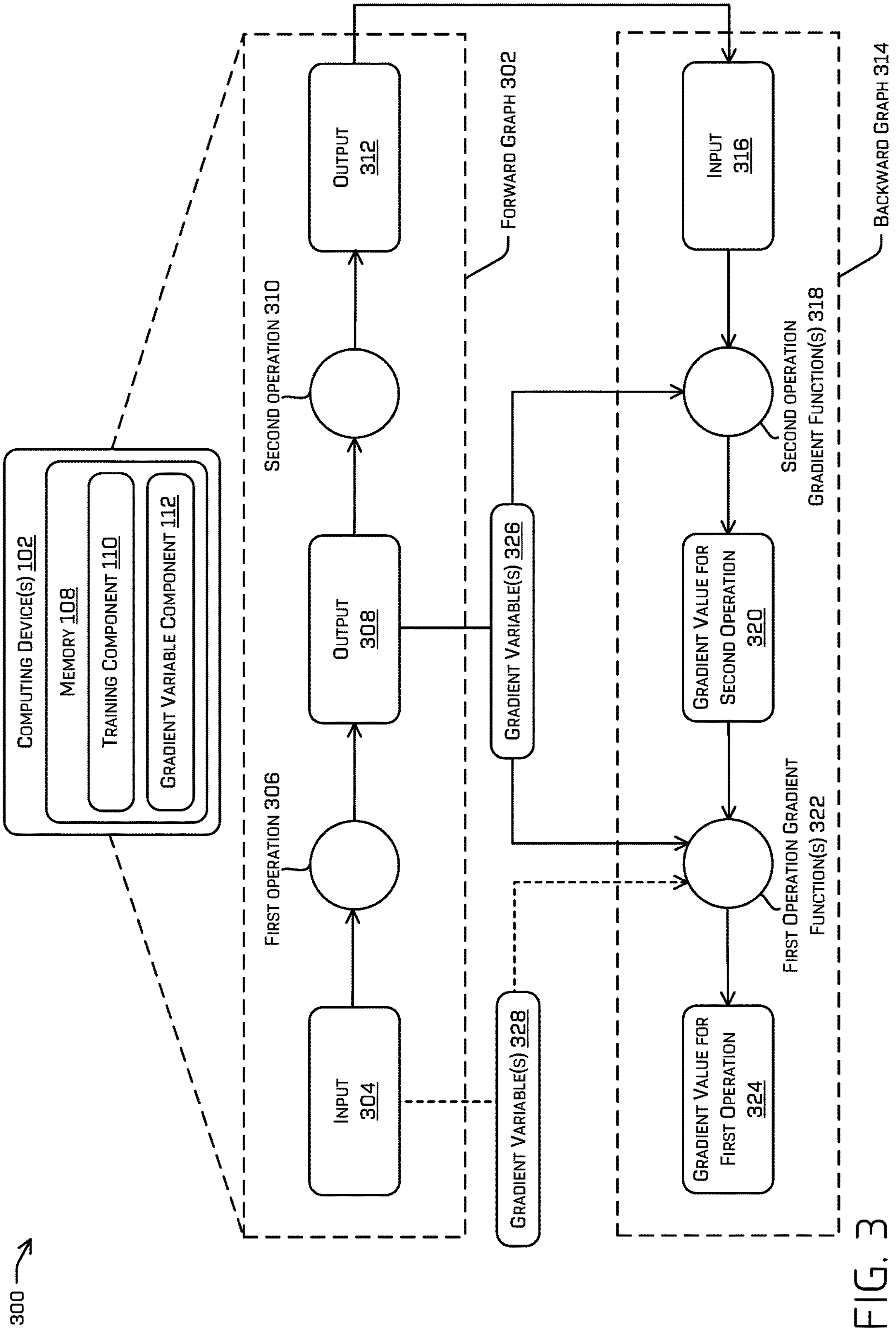
FIG. 3 illustrates an example block diagram of determining gradient variables during training of an example neural network.

FIG. 3 illustrates an example block diagram 300 of determining gradient variables during training of an example neural network. The example 300 includes the components mentioned in FIG. 1, however in other examples the techniques described in the example 300 may be performed by the vehicle computing device(s) 204 and/or the computing device(s) 230.

As illustrated, the example 300 can include, in various examples, the training component 110 generating a forward propagation graph 302 (also referred to as forward graph 302) representing a computation graph associated with forward propagation of a neural network. For instance, the forward graph 302 comprises input 304 to first operation 306 having an output 308 that is subsequently input into second operation 310 having an output 312. In some examples, the input 304 may be representative of training data (e.g., the training data 120).

In some examples, the training component 110 can generate a backward propagation graph 314 (also referred to as backward graph 314) representing a computation graph associated with backward propagation of a neural network. For instance, the backward graph 314 may comprise input 316 to second operation gradient function (a) 318 outputting a gradient value for the second operation 320, which in turn can be used by first gradient value function(s) 322 to determine a gradient value for the first operation 324. In various examples, the first gradient value function(s) 322 and/or the second operation gradient function(s) 318 use gradient variable(s) 326 as an input. For example, the gradient variable component 112 may determine gradient variable(s) 326 usable to determine the gradient value for the first operation 324 and the gradient value for the second operation 320 using techniques discussed throughout this disclosure and below.

The input 304, the output 308, the output 312, and the input 316 may be representative of one or more variables for executing an operation, such as the first operation 306 and the second operation 310. In some examples, the input 304 may be a single value (e.g., x), or multiple values (e.g., x1, x2, x3 . . . xN, where N is an integer greater than 1) that, when operation 306 is executed by a processor, determines the output 308 (a single value (e.g., y), or multiple values (e.g., y1, y2, y3 . . . yN, where N is an integer greater than 1).

In some examples, the forward graph 302 and/or the backward graph 314 may be associated with a compiler (not shown) configured to select a gradient function and/or a variable for use in the forward graph 302 and/or the backward graph 314. For instance, the compiler may select the gradient function(s) usable during backward propagation while building the backward graph 314.

In some examples, the training component 110 can generate a compute graph based at least in part on a global optimization (e.g., can implement a model to identify one or more variables to store during forward propagation usable to compute one or more gradient values during backward propagation).

Though depicted in FIG. 3 to include the first operation 306 and the second operation 310, any number of operations may be included in the neural network (e.g., the neural network 114). For instance, the forward graph 302 may comprise additional operations associate with one or more layers of the neural network. In some examples, the first operation 306 and the second operation 310 may be representative of an operator applied to an input to generate an output. In some examples, the first operation 306 and/or the second operation 310 may comprise at least one of: a ReLU operation, a maximum operation, a minimum operation, an exponentiation operation, a logarithmic operation, a power operation, a sigmoid operation, a softplus operation, or a batch normalization operation, just to name a few.

In some examples, multiple operations (e.g., the first operation and the second operation) may be combined into a single operation. Example operations may include:

ReLU operation:

$$y = \max(x, 0)$$

$$dy/dx = \text{if}(x > 0, 1, 0)$$

$$dy/dx = \text{if}(y > 0, 1, 0)$$

Maximum operation:

$$y = \max(x_1, x_2)$$

$$dy/dx_1 = \text{if}(x_1 > x_2, 1, 0)$$

-continued $$dy/dx_1 = \text{if}(y = x_1, 1, 0)$$

$$dy/dx_1 = \text{if}(y = x_2, 1, 0) \rightarrow \text{if}(y = x_2, 0, 1)$$

Minimum operation:

$$y = \min(x_1, x_2)$$

$$dy/dx_1 = \text{if}(x_1 > x_2, 1, 0)$$

$$dy/dx_1 = \text{if}(y = x_1, 1, 0)$$

$$dy/dx_1 = \text{if}(y = x_2, 1, 0) \rightarrow \text{if}(y = x_2, 0, 1)$$

Exponential operation:

$$y = e^x$$

$$dy/dx = e^x$$

$$dy/dx = y$$

Logarithmic operation:

$$y = \ln(x)$$

$$dy/dx = 1/x$$

$$dy/dx = e^{-y}$$

Power operation:

$$y = x^k,\ k \in R,\ k \notin 2Z$$

$$dy/dx = k * x^{k-1}$$

$$dy/dx = k * y^{(k-1)/k}$$

Loglp operation:

$$y = \ln(x + 1)$$

$$dy/dx = 1/(x + 1)$$

$$dy/dx = y(1 - y)$$

Sigmoid operation:

$$y = 1/(1 + e^{-x})$$

$$dy/dx = (1 + e^{-x})^2 * e^{-x}$$

$$dy/dx = y(1 - y)$$

Softplus operation:

$$y = \ln(e^x + 1)$$

$$dy/dx = e^x/(e^x + 1)$$

$$dy/dx = e^{-y} * (e^y - 1)$$

Batch Normalization operation:

$$\vec{x} = (x_1, \ldots x_n) \in R^n$$

$$\mu_i = \frac{1}{n_i} \sum_{j=1}^{n_i} x_j^{(i)}$$

where $n_i$ is the count of the $i^{th}$ local batch and $$x_j^{(i)}$$

is the jth input from the preceding layer for the $i^{th}$ local batch.

the local batch variance σhd $i^2$ may be computed as:

$$\sigma_i^2 = \frac{1}{n_i} \sum_{j=1}^{n_i} \left(x_j^{(i)} - \mu_i\right)^2$$

$$\vec{z} = \left(\vec{x} - \mu_i\right) / \sqrt{\sigma_i^2 + \varepsilon}$$

$$\vec{y} = \vec{z} * \gamma + \beta$$

$$\vec{z} = \left(\vec{y} - \beta\right)/\gamma$$

$$dL/d\vec{x} = f\left(dL/d\vec{y}, \vec{z}\right)$$

In some examples, the training component 110 can generate the backward graph 314 to omit gradient variables 328 associated with the input 304. For instance, the gradient variable component 112 provides functionality to receive operation data 124 associated with the first operation 306 and the second operation 310, and determine to store gradient variable(s) 326 for use during backward propagation in accordance with the backward graph 314. In some examples, the gradient variable component 112 may be configured to detect, identify, or otherwise determine to store the gradient variable(s) 326 that are usable to compute gradient values for distinct operations of the neural network 114. For instance, the gradient variable(s) 326 may be used as an input to the first gradient value function(s) 322 to determine the gradient value for the first operation 324 and also be used as an input to the second operation gradient function(s) 318 to determine the gradient value for the second operation 320.

The gradient variable component 112 may be configured to determine the gradient variable(s) 326 for storage in memory in a variety of ways. In some examples, the gradient variable component 112 may identify one or more of the first gradient value function(s) 322 and one or more of the second operation gradient function(s) 318 that can make use of associated with the first operation 306 and associated with the second operation 310.

In some examples, the gradient variable component 112 may associate metadata or other information to indicate an intention to store data associated with the first operation 306 and/or the second operation 310. For instance, the gradient variable component 112 may "tag" or associate information with a variable, and identify the variable as usable to another operation based at least in part on the "tagged" information. In some examples, the gradient variable component 112 may identify that the gradient variable(s) 326 is usable as an input to the first gradient value function(s) 322 to determine the gradient value for the first operation 324 and also as an input to the second operation gradient function(s) 318 to determine the gradient value for the second operation 320.

In some examples, the forward graph 302 may include a third operation (not shown) associated with a third gradient value function. In such examples, the gradient variable component 112 may access, based at least in part on metadata or information associated with the gradient variable(s) 326, the gradient variable(s) 326 from memory for use during backward propagation. The accessed variable(s) may be input into the third gradient value function to compute a third gradient value associated with the third operation.

In some examples, the gradient variable component 112 may be configured to determine the gradient variable(s) 326 for storage in memory by determining that the first operation 306 is associated with a first gradient value function relative to the input 304 of the first operation 306 and further associated with a second gradient value function relative to the output 308 of the first operation 306. Here, the first gradient value function and the second gradient value function can also be referred to as the first operation gradient functions 322. In various examples, the gradient variable component 112 can identify that the first gradient value function and the second gradient value function yield a substantially same gradient value result (e.g., either gradient value function yields a gradient value usable to compute the gradient value for the first operation 324). In such examples, either the input 304 or the output 308 may be identified for storage by the gradient variable component 112 as the gradient variable 326, and because either can be used to generate the gradient value for the first operation 324, both need to necessarily be identified for storage. In some examples, the gradient variable component 112 may identify that the second operation 310 can use the output 308 for determining the gradient value for the second operation 320, and based at least in part on the identifying, determine to store the output 308 (e.g., or a variable associated therewith) of the first operation 306 in the memory 108.

In various examples, the gradient variable component 112 may store the output 308 in the memory 108. In some examples, the training component 110 may compute, during backward propagation and based at least in part on the output 308, gradient values associated with both the first operation 306 and the second operation 310.

In some examples, the training component 110 and/or the gradient variable component 112 can perform optimization techniques to determine a subset of gradient variables for storage. For instance, the training component 110 and/or the gradient variable component 112 may implement greedy optimization (e.g., an optimization based on two local operations) and/or global optimization (e.g., an optimization based on three or more operations) to identify one or more gradient variables (e.g., gradient variable(s) 326) usable as an input to multiple value functions associated with operations of a neural network.

Figure 4:
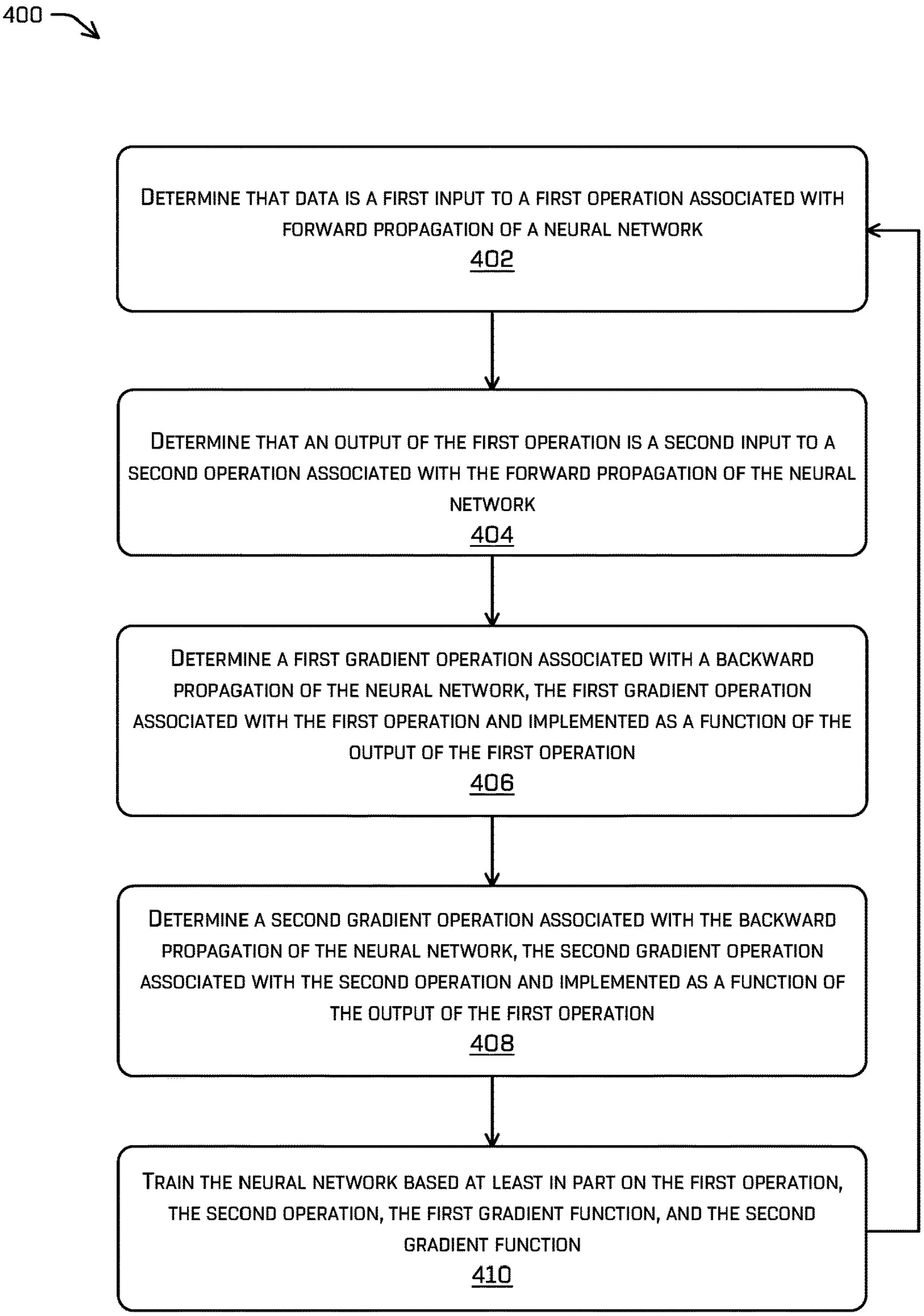
FIG. 4 is a flowchart depicting an example process for determining gradient variables using one or more models during training of an example neural network.

FIG. 4 is a flowchart depicting an example process 400 for determining gradient variables using one or more models during training of an example neural network. Some or all of the process 400 may be performed by one or more components in FIG. 2, as described herein. For example, some or all of process 400 may be performed by the vehicle computing system 204 and/or the computing device(s) 230.

At operation 402, the process may include determining that data is a first input to a first operation associated with forward propagation of a neural network. For instance, the operation 402 can include the training component 110 receiving the input 304 associated with the operation 306 in the forward graph 302 as part of the training data 120. In various examples, the first operation 306 may be associated with an operator that takes an action on the input 304. Examples of various types of training data that can be received are discussed throughout this disclosure.

In some examples, the operation 402 can include capturing sensor data using a plurality of sensors and including the sensor data as at least part of the input 304. In some examples, the input 304 may represent labelled data, previously trained data, cross batch data, or a combination thereof.

At operation 404, the process may include determining that an output of the first operation is a second input to a second operation associated with the forward propagation of the neural network. For instance, the operation 404 can include the training component 110 receiving the output 308 as an input to the operation 310. Generally, the second operation may be associated with a sequence of operations as part of the training data 120.

At operation 406, the process may include determining a first gradient function associated with a backward propagation of the neural network, the first gradient function associated with the first operation and implemented as a function of the output of the first operation. For instance, the operation 406 can include the gradient variable component 112 detecting, identifying, or otherwise determining to store the gradient variable(s) 326 that are usable to compute gradient values for distinct operations of the neural network 114. For instance, the gradient variable(s) 326 may be used as an input to the first gradient value function(s) 322 to determine the gradient value for the first operation 324.

At operation 408 the process can include determining a second gradient function associated with the backward propagation of the neural network, the second gradient function associated with the second operation and implemented as a function of the output of the first operation. For instance, the gradient variable(s) 326 may be used as an input to the second operation gradient function(s) 318 to determine the gradient value for the second operation 320.

At operation 410 the process can include determining a second gradient function associated with the backward propagation of the neural network, the second gradient function associated with the second operation and implemented as a function of the output of the first operation. For instance, the operation 410 can include the gradient variable component 112 determining that the gradient variable functions that use the input 304 or the output 308 generate a substantially same result.

At operation 412 the process can include training the neural network based at least in part on the first operation, the second operation, the first gradient function, and the second gradient function. For instance, the operation 412 can include the gradient variable(s) 326 may be used as an input to the first operation gradient function(s) 322 to determine the gradient value for the first operation 324 and/or as an input to determine the gradient value for the second operation 320. In some examples, the operation 412 can include the training component 110 storing a variable associated with the output 308 in the memory 108. In various examples, the stored variable may be associated with metadata or information to enable the stored variable to be accessed during backward propagation. In other examples, metadata or information may identify a variable to store (or not store) and be usable by the training component 110 to determine a forward propagation graph 302 or a backward propagation graph 314. As depicted in FIG. 4, in some examples the process may, at operation 412, return to operation 402 until each operation in a sequence of operation is processed during forward propagation, (e.g., to determine a third gradient value for a third operation).

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform actions comprising: determining that an output of a first operation is a second input to a second operation associated with forward propagation of a neural network; determining a first gradient function associated with a backward propagation of the neural network, the first gradient function associated with the first operation and implemented as a function of the output of the first operation; determining a second gradient function associated with the backward propagation of the neural network, the second gradient function associated with the second operation and implemented as a function of the output of the first operation; and training the neural network based at least in part on the first operation, the second operation, the first gradient function, and the second gradient function.

B: A system as paragraph A describes, wherein: the first operation comprises at least one of: a rectified linear unit operation, a maximum operation, a minimum operation, an exponentiation operation, a logarithmic operation, a power operation, a sigmoid operation, a softplus operation, or a batch normalization operation, and the actions further comprising: determining, as a determination, a variable associated with the output of the first operation to compute a first gradient value associated with the first operation and a second gradient value associated with the second operation; and determining, based at least in part on the determination, to store the variable associated with the output of the first operation in memory to use during backward propagation of the neural network.

C: A system as paragraphs A or B describe, the actions further comprising: determining, based on determining that the first gradient function associated with the first operation can be implemented as the function of the output of the first operation, not to store a variable associated with a first input of the first operation in memory during the forward propagation; and computing, during backward propagation and as a function of the output of the first operation, a first gradient value associated with the first operation and a second gradient value associated with the second operation.

D: A system as paragraphs A-C describe, the actions further comprising: generating a backward computation graph indicating an order to compute a first gradient value associated with the first operation relative to a second gradient value associated with the second operation.

E: A system as paragraphs A-D describe, the actions further comprising: storing, in memory, a variable associated with the output of the first operation; associating metadata with the variable stored in the memory; receiving a third operation associated with the forward propagation of the neural network; and accessing, based at least in part on the metadata, the variable from the memory to compute a third gradient value associated with the third operation.

F: A method comprising: receiving a first operation associated with forward propagation of a neural network; determining, based at least in part on the first operation, a second operation associated with backward propagation of the neural network, the second operation comprising one of a first gradient value function or a second gradient value function, wherein: the first gradient value function and the second gradient value function yield a same result; the first gradient value function is based, at least in part, on an input to the first operation; and the second gradient value function is based, at least in part, on an output of the first operation; and training the neural network based at least in part on the first operation or the second operation.

G: A method as paragraph F describes, further comprising: determining, based at least in part on selecting the first gradient value function or the second gradient value function, to store, in a memory, either the input to the first operation or the output of the first operation.

H: A method as paragraphs F or G describe, wherein the first operation comprises at least one of: a rectified linear unit operation, a maximum operation, a minimum operation, an exponentiation operation, a logarithmic operation, a power operation, a sigmoid operation, a softplus operation, or a batch normalization operation.

I: A method as paragraphs F-H describe, wherein the input is a first input, and the method further comprises: determining that the output of the first operation is a second input to a third operation associated with the forward propagation of the neural network; and generating a backward computation graph including the second gradient value function and a third gradient value function associated with the second operation.

J: A method as paragraphs F-I describe, further comprising: associating, based at least in part on the second gradient value function, metadata with the output; and accessing, based at least in part on the metadata, the output to compute a gradient value associated with the second operation.

K: A method as paragraphs F-J describe, further comprising: determining, during the backward propagation and based at least in part on accessing the input or the output, a first gradient value associated with the first operation.

L: A method as paragraphs F-K describe, wherein the determining the first gradient value associated with the first operation is based on accessing the output.

M: A method as paragraphs F-L describe, further comprising determining a compute graph based at least in part on a global optimization algorithm.

N: A method as paragraphs F-M describe, further comprising determining, during the backward propagation and based at least in part on accessing the input or the output, a second gradient value of the second operation.

O: A method as paragraphs F-N describe, further comprising: determining, based at least in part on the metadata associated with the output, to not store a second variable associated with the second operation.

P: One or more non-transitory computer-readable media storing instructions that, when executed, cause one or more processors to perform actions comprising: identifying a variable used in forward propagation of a neural network, the variable being an output from a first operation of the neural network and an input to a second operation of the neural network; providing the variable to a first gradient value function and a second gradient value function, wherein: the first gradient value function is associated with the first operation; and the second gradient value function is associated with the second operation; and training, based on the providing the variable to the first gradient value function and the second gradient value function, the neural network.

Q: One or more non-transitory computer-readable media as paragraph P describes, wherein: the variable is a first variable; the variable is an output variable of the first operation; and the first gradient function is selected as opposed to an alternate gradient value function that uses a second variable different from the first variable.

R: One or more non-transitory computer-readable media as paragraphs P or Q describe, the actions further comprising: generating at least one of: a backward computation graph indicating an order for computing a first gradient value relative to a second gradient value; or a forward computation graph indicating use of either the first variable or the second variable.

S: One or more non-transitory computer-readable media as paragraphs Q-R describe, the actions further comprising: determining, during backward propagation and based at least in part on accessing the variable, a first gradient value associated with the first operation T: One or more non-transitory computer-readable media as paragraphs Q-S describe, the actions further comprising: associating metadata with the variable; and accessing, based at least in part on the metadata, the variable from a memory to compute a gradient value associated with the second operation.

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the one or more processors to perform actions comprising:

determining that an output of a first operation is an input to a second operation associated with forward propagation of a neural network;

determining a first gradient function associated with a backward propagation of the neural network, the first gradient function associated with the first operation and implemented as a function of the output of the first operation;

determining a second gradient function associated with the backward propagation of the neural network, the second gradient function associated with the second operation and implemented as the function of the output of the first operation;

determining a variable associated with the output of the first operation based at least in part on the second gradient function being implemented as the function of the output of the first operation;

computing, based at least in part on the variable, a first gradient value associated with the first operation and a second gradient value associated with the second operation;

training the neural network based at least in part on the first operation, the second operation, the first gradient function, the second gradient function, and the variable, the neural network, once trained, is configured to control operation of a vehicle; and reducing, based at least in part on training the neural network, a number of gradient values stored in a memory.

2. The system of claim 1, wherein:

the first operation comprises at least one of: a rectified linear unit operation, a maximum operation, a minimum operation, an exponentiation operation, a logarithmic operation, a power operation, a sigmoid operation, a softplus operation, or a batch normalization operation, and the actions further comprising:

determining, based at least in part on determining the variable, to store the variable associated with the output of the first operation in the memory for the first gradient function and the second gradient function to use during the backward propagation of the neural network.

3. The system of claim 1, the actions further comprising:

determining, based on determining that the first gradient function associated with the first operation can be implemented as the function of the output of the first operation, not to store the variable associated with a first input of the first operation in the memory during the forward propagation; and computing, during the backward propagation and as the function of the output of the first operation, the first gradient value associated with the first operation and the second gradient value associated with the second operation.

4. The system of claim 1, the actions further comprising:

generating a backward computation graph indicating an order to compute the first gradient value associated with the first operation relative to the second gradient value associated with the second operation.

5. The system of claim 1, the actions further comprising:

storing, in the memory, the variable associated with the output of the first operation;

associating metadata with the variable stored in the memory;

receiving a third operation associated with the forward propagation of the neural network; and accessing, based at least in part on the metadata, the variable from the memory to compute a third gradient value associated with the third operation.

6. The system of claim 1, wherein training the neural network does not require storage of the second gradient value output by the second gradient function.

7. A method comprising:

receiving a first operation associated with forward propagation of a neural network;

determining, based at least in part on the first operation, a second operation associated with backward propagation of the neural network, the second operation comprising one of a first gradient value function or a second gradient value function, wherein:

the first gradient value function and the second gradient value function yield a same gradient value result;

the first gradient value function is based, at least in part, on an input to the first operation; and the second gradient value function is based, at least in part, on an output of the first operation;

determining, based at least in part on the first gradient value function and the second gradient value function yielding the same gradient value result, a variable associated with the output of the first operation to compute a first gradient value associated with the first operation and a second gradient value associated with the second operation;

training the neural network based at least in part on the first operation, the second operation, and the variable; and reducing, based at least in part on training the neural network, a number of gradient values stored in a memory.

8. The method of claim 7, further comprising:

determining, based at least in part on selecting the first gradient value function or the second gradient value function, to store, in the memory, either the input to the first operation or the output of the first operation.

9. The method of claim 7, wherein the first operation comprises at least one of: a rectified linear unit operation, a maximum operation, a minimum operation, an exponentiation operation, a logarithmic operation, a power operation, a sigmoid operation, a softplus operation, or a batch normalization operation.

10. The method of claim 7, wherein the input is a first input, and the method further comprises:

determining that the output of the first operation is a second input to a third operation associated with the forward propagation of the neural network; and generating a backward computation graph including the second gradient value function and a third gradient value function associated with the second operation.

11. The method of claim 7, further comprising:

associating, based at least in part on the second gradient value function, metadata with the output; and accessing, based at least in part on the metadata, the output to compute the second gradient value associated with the second operation.

12. The method of claim 11, further comprising:

determining, based at least in part on the metadata associated with the output, to not store a second variable associated with the second operation.

13. The method of claim 7, wherein determining the first gradient value associated with the first operation is based on accessing the output.

14. The method of claim 7, further comprising determining a compute graph based at least in part on a global optimization algorithm.

15. The method of claim 7, further comprising determining, during the backward propagation and based at least in part on accessing the input or the output, the second gradient value of the second operation.

16. One or more non-transitory computer-readable media storing instructions that, when executed, cause one or more processors to perform actions comprising:

identifying a variable used in forward propagation of a neural network, the variable being an output from a first operation of the neural network and an input to a second operation of the neural network;

providing the variable to a first gradient value function and a second gradient value function at a same time, wherein:

the first gradient value function is associated with the first operation; and the second gradient value function is associated with the second operation;

9training, based on providing the variable to the first gradient value function and the second gradient value function, the neural network; and reducing, based at least in part on training the neural network, a number of gradient values stored in a memory.

17. The one or more non-transitory computer-readable media of claim 16, wherein:

the variable is a first variable;

the variable is an output variable of the first operation; and the first gradient value function is selected as opposed to an alternate gradient value function that uses a second variable different from the first variable.

18. The one or more non-transitory computer-readable media of claim 17, the actions further comprising:

generating at least one of:

a backward computation graph indicating an order for computing a first gradient value relative to a second gradient value; or a forward computation graph indicating use of either the first variable or the second variable.

19. The one or more non-transitory computer-readable media of claim 16, the actions further comprising:

determining, during backward propagation and based at least in part on accessing the variable, a first gradient value associated with the first operation.

20. The one or more non-transitory computer-readable media of claim 16, the actions further comprising:

associating metadata with the variable; and accessing, based at least in part on the metadata, the variable from the memory to compute a second gradient value associated with the second operation.

* * * * *